(12) United States Patent
Amin-Sanayei et al.

(10) Patent No.: US 12,497,503 B2
(45) Date of Patent: Dec. 16, 2025

(54) FLUOROPOLYMER DISPERSION FOR SEPARATOR COATING INCLUDING MULTIPHASE FLUOROPOLYMER

(71) Applicant: Arkema Inc., King of Prussia, PA (US)

(72) Inventors: Ramin Amin-Sanayei, Malvern, PA (US); Steven M. Baxter, Chalfont, PA (US); Thomas Fine, Lyons (FR); Yujie Liu, Norristown, PA (US)

(73) Assignee: Arkema Inc., King of Prussia, PA (US)

( * ) Notice: Subject to any disclaimer, the term of this patent is extended or adjusted under 35 U.S.C. 154(b) by 284 days.

(21) Appl. No.: 16/975,428

(22) PCT Filed: Mar. 1, 2019

(86) PCT No.: PCT/US2019/020198
§ 371 (c)(1),
(2) Date: Aug. 25, 2020

(87) PCT Pub. No.: WO2019/169217
PCT Pub. Date: Sep. 6, 2019

(65) Prior Publication Data
US 2020/0407543 A1 Dec. 31, 2020

Related U.S. Application Data

(60) Provisional application No. 62/637,534, filed on Mar. 2, 2018.

(51) Int. Cl.
*C08L 27/16* (2006.01)
*C09D 1/00* (2006.01)
(Continued)

(52) U.S. Cl.
CPC ............... *C08L 27/16* (2013.01); *C09D 1/00* (2013.01); *C09D 127/16* (2013.01);
(Continued)

(58) Field of Classification Search
CPC ... C08L 27/16; H01M 50/489; H01M 50/446; H01M 50/443; H01M 50/451; C09D 1/00; C09D 127/16
(Continued)

(56) References Cited

U.S. PATENT DOCUMENTS 5,707,763 A * 1/1998 Shimizu ............... C08F 259/08
429/217
7,241,817 B2 7/2007 Bonnet et al.
(Continued)

FOREIGN PATENT DOCUMENTS

JP   H11260411 A   9/1999
JP   2002050405 A  2/2002
(Continued)

OTHER PUBLICATIONS

"Blend." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1227096. (Year: 2010).*
(Continued)

*Primary Examiner* — Sean P Cullen
(74) *Attorney, Agent, or Firm* — Joanne Rossi

(57) ABSTRACT

The invention relates to a fluoropolymer coating composition that can be used, for example, in coating electrodes and/or separators in electrochemical devices. The fluoropolymer coating composition preferably contains multiple fluoropolymer phases. The coated electrodes and/or separators have both excellent wet adhesion, excellent dry adhesion, and low leachables. Each of the fluoropolymer phases contains polymers having at least 10 weight percent, of a common fluoromonomer, making the polymer phases compatible with each other, and allowing for the phases to be distributed fairly homogeneously on a macroscopic level
(Continued)

throughout the composition and dried coating formed from the composition.

14 Claims, 4 Drawing Sheets

(51) Int. Cl.
| | | |
|---|---|---|
| C09D 127/16 | (2006.01) | |
| H01M 50/443 | (2021.01) | |
| H01M 50/446 | (2021.01) | |
| H01M 50/451 | (2021.01) | |
| H01M 50/489 | (2021.01) | |

(52) U.S. Cl.
CPC ....... *H01M 50/443* (2021.01); *H01M 50/446* (2021.01); *H01M 50/451* (2021.01); *H01M 50/489* (2021.01); *C08L 2203/206* (2013.01); *C08L 2207/02* (2013.01); *C08L 2207/53* (2013.01)

(58) Field of Classification Search
USPC ................................. 429/144, 217, 254, 251
See application file for complete search history.

(56) References Cited

U.S. PATENT DOCUMENTS

| | | | |
|---|---|---|---|
| 7,351,498 B2 | 4/2008 | Watarai et al. | |
| 7,662,517 B2 | 2/2010 | Lee et al. | |
| 7,704,641 B2 | 4/2010 | Yong et al. | |
| 8,765,890 B2 | 7/2014 | Amin-Sanayei et al. | |
| 9,548,167 B2 | 1/2017 | Amin-Sanayei et al. | |
| 2003/0114614 A1* | 6/2003 | Wille | C08F 214/22 526/334 |
| 2008/0131776 A1* | 6/2008 | Sakuma | H01M 4/623 525/199 |
| 2014/0242444 A1* | 8/2014 | Nishikawa | H01M 50/26 429/144 |
| 2014/0305863 A1* | 10/2014 | Van Engelen | B01D 69/125 427/508 |
| 2015/0030906 A1 | 1/2015 | Amin-Sanayei et al. | |
| 2015/0083975 A1 | 3/2015 | Yeou | |
| 2015/0340676 A1 | 11/2015 | Schmidhauser et al. | |
| 2016/0009840 A1 | 1/2016 | Amin-Sanayei | |
| 2017/0179456 A1* | 6/2017 | Kim | C09D 127/16 |
| 2017/0179520 A1* | 6/2017 | Seo | H01M 10/0525 |
| 2018/0044456 A1 | 2/2018 | Freeman et al. | |
| 2018/0331342 A1* | 11/2018 | Honda | H01M 50/491 |
| 2019/0103593 A1* | 4/2019 | Kai | H01M 50/446 |
| 2019/0207189 A1* | 7/2019 | Arai | H01M 50/417 |

FOREIGN PATENT DOCUMENTS

| | | | | |
|---|---|---|---|---|
| JP | 2005056800 A | | 3/2005 | |
| JP | 2011258351 A | | 12/2011 | |
| JP | 2013161707 A | | 8/2013 | |
| JP | 2018172595 A | * | 11/2018 | ............ C08F 259/08 |
| WO | 2013110740 A1 | | 8/2013 | |
| WO | 2016149238 A1 | | 9/2016 | |
| WO | WO-2017082261 A1 | * | 5/2017 | ............ C09J 127/16 |
| WO | WO-2018027652 A1 | * | 2/2018 | ........... H01M 50/489 |
| WO | WO-2018037867 A1 | * | 3/2018 | ........... H01M 10/052 |

OTHER PUBLICATIONS

Solef PVDF—Typical Properties, Solvay 2014, p. 7.
Gal'perin and Tsvankin, The Melting Temperature and the Structure of Fluorine Containing Polymers, Polymer Sciences U.S.S.R., vol. 18, No. 12, 1976, Published Oct. 1977, title page and pp. 3073-3083.

* cited by examiner

FLUOROPOLYMER DISPERSION FOR SEPARATOR COATING INCLUDING MULTIPHASE FLUOROPOLYMER

CROSS-REFERENCE TO RELATED APPLICATIONS

This application is a national stage application under 35 U.S.C. § 371 of PCT Application Number PCT/US2019/020198, filed Mar. 1, 2019; which claims the benefit of U.S. Provisional Application No. 62/637,534, filed Mar. 2, 2018; said applications are herein incorporated by reference.

FIELD OF THE INVENTION

The invention relates to a fluoropolymer binder composition that can be used, for example, in coating electrodes and/or separators in electrochemical devices. The fluoropolymer coating composition preferably contains multiple fluoropolymer phases. The coating on electrodes and/or separators has both excellent wet adhesion, excellent dry adhesion, and low leachables. These properties can be optimized by adjusting the polymer properties of each of the phases, such as the crystallinity, functionality, crosslinking, branching and comonomer(s). The phase(s) providing excellent wet adhesion have low-swelling, as can be achieved, for example by a high level of crystallinity, and the phase(s) providing excellent dry adhesion are softer and are more highly swellable in electrolyte. The softness and higher swelling can be accomplished through the incorporation of comonomer units and/or functional groups. Each of the fluoropolymer phases contains polymers having at least 10 weight percent, of a common fluoromonomer, making the polymer phases compatible with each other, and allowing for the phases to be distributed fairly homogeneously on a macroscopic level throughout the composition and dried coating formed from the composition.

BACKGROUND OF THE INVENTION

Lithium batteries, including lithium metal batteries, lithium ion batteries, lithium polymer batteries, and lithium ion polymer batteries are finding increased usage due to higher voltages and higher energy densities than those of conventional batteries (such as Ni-MH batteries).

Currently available lithium ion batteries and lithium ion polymer batteries use polyolefin-based separators in order to prevent a short circuit between a cathode and an anode. However, because such polyolefin-based separators have a melting point of 140° C. or less, they can shrink melt in use, resulting in a change in volume when the temperature of a battery is increased by internal and/or external factors, and that may cause a short-circuit. Additionally, polyolefin-based separators are susceptible to oxidation when in contact with high voltage active materials. Oxidation of polyolefin separators reduces the cycle life and generates pin-holes, and that may cause a short-circuit. The short circuit can result in accidents—such as explosion or fire in a battery caused by emission of electric energy. As a result, it is necessary to provide a separator that does not cause heat shrinking at high temperature or oxidize at high voltage.

Polyvinylidene fluoride, because of its excellent electrochemical resistance and superb adhesion among fluoropolymers, has been found to be useful as a binder or coating for the separator, cathode and anode of a non-aqueous electrolytic devices. U.S. Pat. Nos. 7,662,517, 7,704,641, US 2010/00330268, U.S. Pat. No. 9,548,167, and US 2015/0030906 incorporated herein by reference, describe a PVDF copolymer solution in organic solvents and in aqueous dispersion which is used in conjunction with a powdery metal oxide materials or nano-ceramics in the coating of a polyolefin separator to be used in a non-aqueous-type battery. The separator forms a barrier between the anode and the cathode in the battery. It was found that the bound inorganic particles on the porous organic separator increased the volume of space that a liquid electrolyte infiltrates, resulting in improved ionic conductivity.

Unfortunately, the excellent properties provided by fluoropolymers can also limit the applications in which they can be used. For example, it is difficult to adhere fluoropolymers to other materials. Therefore, organic solvent and other organic additives are generally used in a coating formulation to provide good adhesion (non-reversible adhesion) between PVDF-based polymers, a porous separator or electrode, and optionally added powdery particles.

Organic-solvent-based solution/slurry compositions present safety, health and environmental dangers that are not present in an aqueous system. Organic solvents are generally toxic and flammable, volatile in nature, and involve special manufacturing controls to mitigate risk and reduce environmental pollution from the organic solvent. Further, extra manufacturing steps, costing time, money, and energy are involved to isolate PVDF copolymers formed in an aqueous media, drying the PVDF based polymer to a powder, and then dissolving the powder in a solvent. Therefore, aqueous compositions are preferred.

Organic additives, such as acrylics and/or carboxylated-methyl-cellulose (CMC) are susceptible to electrochemical attack at an elevated voltage, and will oxidize and degrade. The byproducts of resin degradation, i.e. water, could deteriorate battery performance. Furthermore, most acrylics and other additives do not have sufficient solvent resistance and could dissolve in the electrolyte solvents, reducing the safety factor as well as battery cycle-life.

Functional groups have been added to fluoropolymers in order to increase adhesion to other materials, improve wettability, and provide malleability. Functionality has been added by several means, such as, by direct copolymerization of a functional monomer into backbone of the fluoromonomers, and by a post-polymerization grafting mechanism, such as the grafting of maleic anhydride onto a polyvinylidene fluoride homopolymer or copolymer, as described in U.S. Pat. No. 7,241,817, to form KYNAR® ADX resins available from Arkema Inc. WO 2013/110740 and U.S. Pat. No. 7,351,498 further describe functionalization of a fluoropolymer by monomer grafting or by copolymerization. WO16149238 and US2016009840 further disclose functionalization of fluoropolymers by adding small levels of comonomer or functional chain transfer agent to the polymerization process. However, it is difficult to add functional monomer units directly into the polymerizing polymer backbone, especially in a random manner, due to the aggressive nature of the fluorine-containing free radicals.

A fluoropolymer-based composition used in the electrode and/or separator of an electrochemical device should have both excellent wet adhesion, and excellent dry adhesion, and low extractables. Good wet adhesion and mechanical strength can be obtained by using a fluoropolymer having high crystallinity. Unfortunately, these high crystalline fluoropolymers have poor dry adhesion. Functional polymers provide good dry adhesion, but have reduced crystallinity, and thus compromise the binder's mechanical strength.

Surprisingly, it has now been found that a fluoropolymer resin composition, and especially a multi-phase fluoropolymer resin composition, can provide both good wet adhesion and good dry adhesion, with low leachables. The multi-phase fluoropolymer composition contains at least one rigid, low-swellable, strong mechanical property phase, where the rigidity of the polymer phase can come from, for example, a high level of crystalline, cross-linking, a high level of long chain branching, or other means which limit its solubility in an electrolyte (good wet adhesion), The other phase is softer and tackier, and is more highly swellable, providing good dry adhesion, and can have 0.1 to 25% by weight functionality. While this softer phase will have a higher solubility and swelling in an electrolyte, the whole binder composition as a dried coating, will have less than 10 percent leachable polymer.

The phases of the multi-phase binder composition can be a blend of two or more separate compatible polymers, or can exist in a single, multi-phase particle—the higher swelling, functional phase can be concentrated on the outside of the multi-phase polymer particle or the multiphase particle can be a heterogeneous co-continuous polymer or one phase can be continuous and the other be discrete within the continuous phase. Separators, cathodes and anodes coated with the multi-phase polymer binder not only have good mechanical strength and good wet/dry adhesion, but also provide the separator or electrode with dimensional stability at elevated temperature.

Current products do not have the balance of both wet adhesion, dry adhesion, and low leachables, as found in the fluoropolymer binder composition of the invention.

SUMMARY OF THE INVENTION

The invention relates to a multiphase binder composition having a low-swelling fluoropolymer phase, and a softer, higher swelling fluoropolymer phase. The invention also relates to a multi-phase binder having a high crystalline phase and a phase containing a fluoropolymer having functionality.

The invention further relates to a dried binder composition having the properties of very good wet adhesion, very good dry adhesion, and low leachables.

The invention further relates to a single, multi-phase fluoropolymer particle having a high crystalline fluoropolymer core and at least one outer phase containing a fluoropolymer having functionality.

The invention further relates to a binder composition comprising a single, multi-phase heterogeneous co-continuous fluoropolymer particle having a high crystalline phase and a phase containing a fluoropolymer having functionality.

The invention further relates to a binder composition comprising a single, multi-phase heterogeneous co-continuous fluoropolymer particle having composition having a low-swelling fluoropolymer phase, and a higher swelling fluoropolymer phase.

The multi-phase fluoropolymer coating composition may be an aqueous or solvent dispersion, or a solvent solution, with or without added particles Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

DETAILED DESCRIPTION OF THE INVENTION

Figure 1:
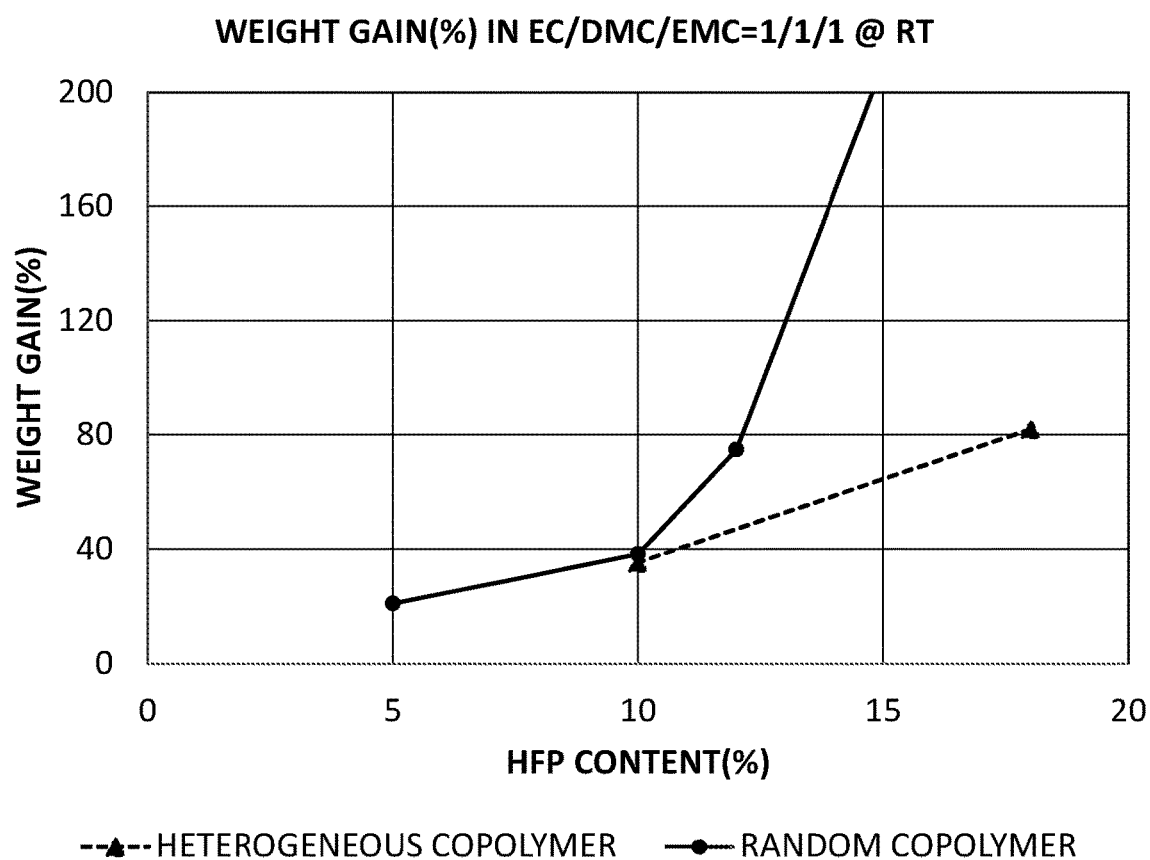
FIG. 1 shows the % Weight gain as a function of comonomer (HFP) in Heterogeneous and in random copolymers.
Figure 2:
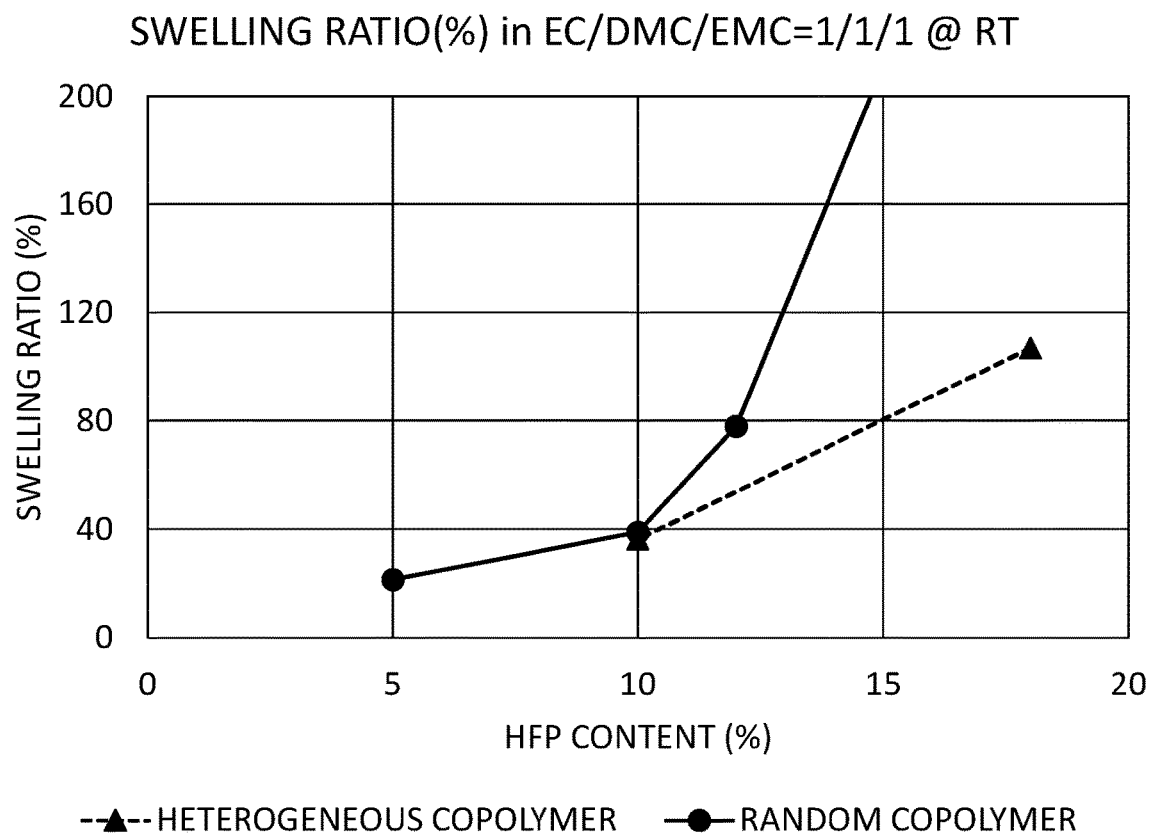
FIG. 2 shows the Swelling Ratio (%) as a function of comonomer (HFP) in Heterogeneous and in random copolymers.
Figure 3:
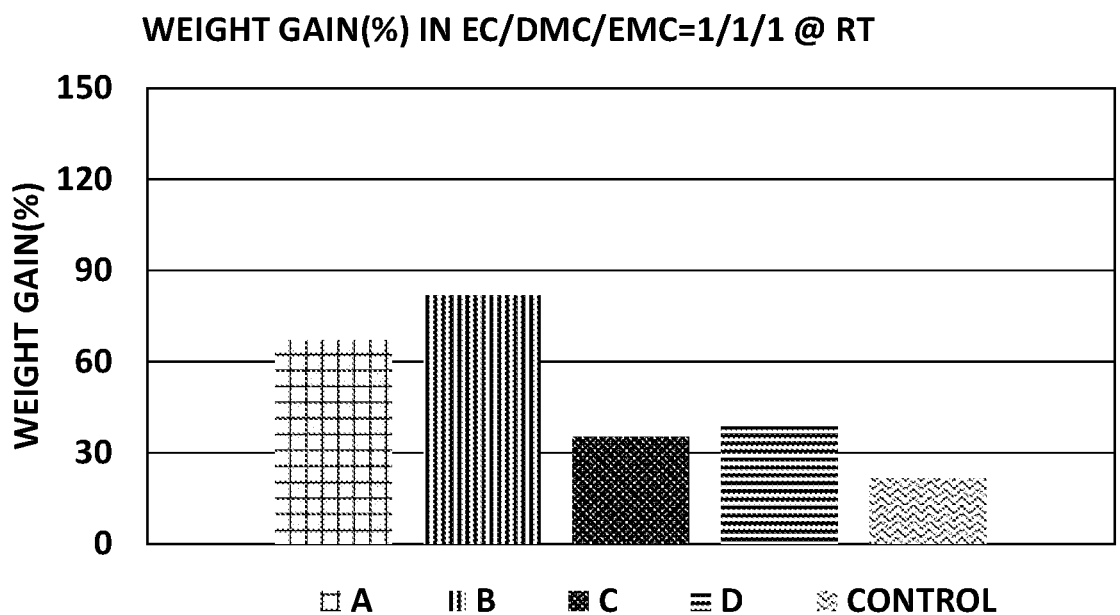
FIG. 3 show the % Weight gain as a bar graph.
Figure 4:
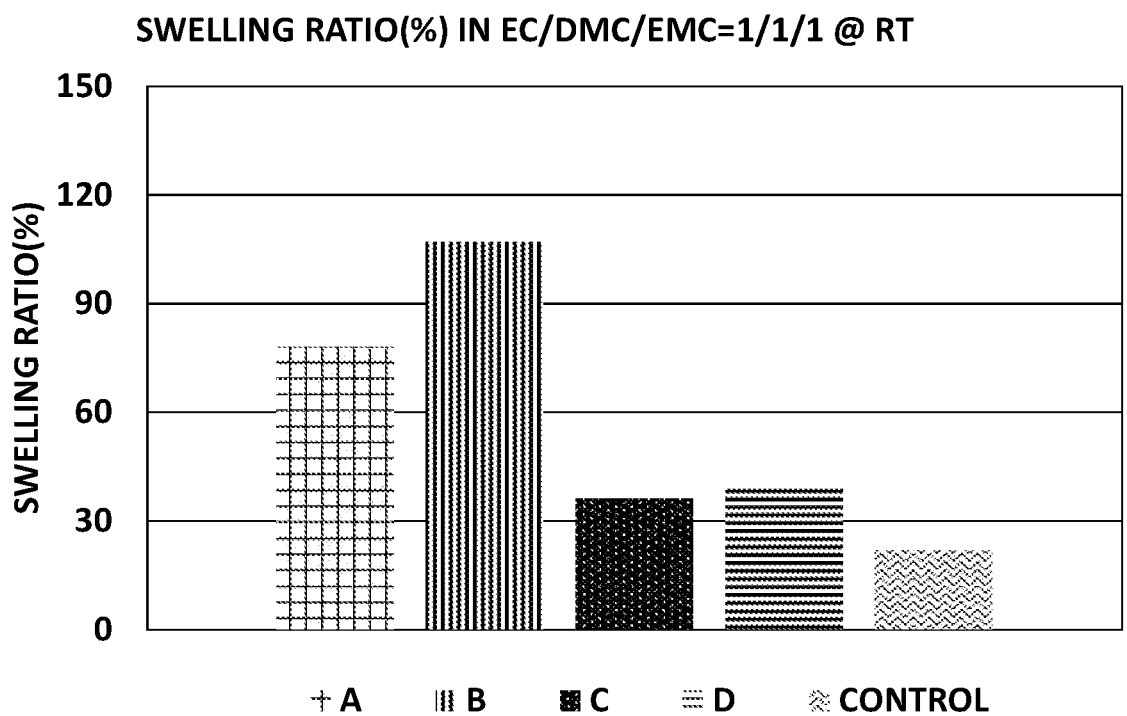
FIG. 4 show the Swelling Ratio (%) as a bar graph.

All references listed in this application are incorporated herein by reference. All percentages in a composition are weight percent, unless otherwise indicated, and all molecular weights are given as weight average molecular weight as determined by a GPC using PMMA as the standard, unless stated otherwise.

The term "polymer" is used to mean both homopolymers, copolymers and terpolymers (three or more monomer units), unless otherwise stated. Copolymer" is used to mean a polymer having two or more different monomer units. For example, as used herein, "PVDF" and "polyvinylidene fluoride" is used to connote both the homopolymer and copolymers, unless specifically noted otherwise.

The term "phase" or "phases" is used to denote a separate polymer domain. Since each of the phases of the composition contain common monomer units, the phases will co-exist as fairly evenly, interdispersed polymer chains in a solvent coating, be relatively homogeneously dispersed in a dispersion coating blend of two or more polymer phases, and be intimately linked in a coating containing multi-phase particles. Each of the different phases may be described in multiple ways, and will herein be described as, for example a) low swelling/softer and higher swelling phases; b) highly crystalline/having functionality phases, and c) good wet adhesion/good dry adhesion phases.

The term "binder" is used to refer to a fluoropolymer composition that can be coated onto a substrate, optionally contains particles for improved dimensional stability, and for this invention a substrate is primarily either an anode, cathode, or separator as found in an electrochemical device. The composition, and especially the multi-phase fluoropolymer particle, as described herein could be used in other fluoropolymer coating and resin applications.

Dry adhesion and wet adhesion: To develop dry adhesion, the fluoropolymer must be deformed enough during a casting and/or the compression step to adhere to the electrode or separator, and adhere to any inorganic particles in the coating. Generally, the higher adhesion the better. Adding functionality to the polymer could enhance the adhesion. Wet adhesion relates to the fluoropolymer swollen in electrolyte. The electrolyte tends to soften the fluoropolymer in a manner similar to that caused by a plasticizer. Adding functionality to the fluoropolymer tends to soften the fluoropolymer making it less brittle and increase swelling. Therefore, a very soft binder able to generate good dry adhesion will likely be too soft when swollen by electrolyte, will lose its cohesion strength, and will not develop a good wet adhesion.

The invention relates to a multiphase fluoropolymer composition having a low-swelling, highly crystalline, fluoropolymer phase for good wet adhesion and mechanical properties; and a softer, higher swelling functional polymer phase for good dry adhesion properties. These phases can exist as separate polymer particles or chains, or can exist in a single, multi-phase particle. In any multi-phase composition, each of the phases contain a fluoropolymer having at least 10 weight percent, preferably at least 25 weight percent, more preferably at greater than 50 weight percent, and even more preferably at least 70 weight percent of the same fluoromonomer units. In a preferred embodiment, the common fluoromonomer units in each polymer phase are vinylidene fluoride monomer units.

Fluoropolymers

The fluoropolymers of the invention are formed primarily of fluoromonomers. The term "fluoromonomer" or the expression "fluorinated monomer" means a polymerizable alkene which contains at least one fluorine atom, fluoroalkyl group, or fluoroalkoxy group attached to the double bond of the alkene that undergoes polymerization. The term "fluoropolymer" means a polymer formed by the polymerization of at least one fluoromonomer, and it is inclusive of homopolymers, copolymers, terpolymers and higher polymers which are thermoplastic in their nature, meaning they are capable of being formed into useful pieces by flowing upon the application of heat, such as is done in molding and extrusion processes. The fluoropolymer preferably contains at least 50 mole percent of one or more fluoromonomers.

Fluoromonomers useful in the practice of the invention include, for example, vinylidenefluoride (VDF), tetrafluoroethylene (TFE), trifluoroethylene (VF3), chlorotrifluoroethylene (CTFE), hexafluoropropene (HFP), vinyl fluoride (VF), hexafluoroisobutylene, perfluorobutylethylene (PFBE), pentafluoropropene, 2,3,3,3-tetrafluoropropene (HFO-1234yf), 2-chloro-1-1-difluoroethylene (R-1122), 3,3,3-trifluoro-1-propene, 2-fluoromethyl-3,3,3-trifluoropropene, a fluorinated vinyl ether, a fluorinated allyl ether, a non-fluorinated allyl ether, a fluorinated dioxole, and combinations thereof.

Especially preferred polymers are homopolymers of VDF, and copolymers made by the process of the invention are copolymers of VDF with HFP, TFE or CTFE, comprising from about 50 to about 99 weight percent VDF, more preferably from about 70 to about 99 weight percent VDF.

Especially preferred terpolymers are the terpolymer of VDF, HFP and TFE, and the terpolymer of VDF, trifluoroethene, and TFE. The especially preferred terpolymers have at least 10 weight percent VDF, and the other comonomers may be present in varying portions, but together they comprise up to 90 weight percent of the terpolymer.

The PVDF for use in the binder composition preferably has a high molecular weight. By high molecular weight, as used herein, is meant PVDF having a melt viscosity of greater than 1.0 kilopoise, preferably greater than 5 kilopoise, more preferably greater than 10 kilopoise, and even greater than 20 kilopoise, according to ASTM method D-3835 measured at 450° F. (232° C.) and 100 sec$^{-1}$.

The fluoropolymers of the invention can be made by means known in the art, such as by an emulsion, suspension, solution, or supercritical $CO_2$ polymerization process. Preferably the fluoropolymer is formed by an emulsion or suspension process.

The fluoropolymer is polymerized using a free-radical initiator. The quantity of an initiator required for a polymerization is related to its activity and the temperature used for the polymerization. The total amount of initiator used is generally between 100 to 5000 ppm by weight on the total monomer weight used. Typically, sufficient initiator is added at the beginning to start the reaction and then additional initiator may be optionally added to maintain the polymerization at a convenient rate.

Surfactants are generally used to stabilize the fluoropolymer emulsion particles. In a preferred embodiment, the fluoropolymer dispersion if fluorosurfactant-free. By "fluorosurfactant-free" is meant that all surfactants used in making the aqueous fluoropolymer do not contain a fluorine atom (are "non-fluorinated surfactants"). The term refers to all surfactants used in making and processing the aqueous fluoropolymer dispersion, as and preferably to all the surfactants in the composition of the invention, including: all surfactants used during the polymerization process—whether added up-front, fed continuously during the polymerization, fed partly before and then during polymerization, or fed after the polymerization has started and progressed for a time; and all preferably all surfactants added post-polymerization to improve latex stability. Non-fluorinated surfactants useful in the PVDF polymerization could be both ionic and non-ionic in nature including, but are not limited to, 3-allyloxy-2-hydroxy-1-propane sulfonic acid salts, polyvinylphosphonic acid, polyacrylic acids, polyvinyl sulfonic acid, and salts thereof, polyethylene glycol and/or polypropylene glycol and the block copolymers thereof, alkyl phosphonates and siloxane-based surfactants.

The PVDF emulsion polymerization results in a latex generally having a solids level of 10 to 60 percent by weight, preferably 10 to 50 percent, and having a weight average particle size of less than 1 micrometer, preferably less than 1000 nm, preferably less than 800 nm, and more preferably less than 600 nm. The weight average particle size is generally at least 20 nm and preferably at least 50 nm. The weight average particle size can be from 20 nm to 800 nm or from 20 nm to 600 nm. The polymer particles may form agglomerates having a weight average particle size of from 1 to 30 micrometers, and preferably from 2 to 10 micrometers or from 2 to 8 microns. The agglomerates can break into discrete particles during the formulation and application to a substrate.

While the fluoropolymer of the invention having good wet adhesion, good dry adhesion, and low leachables can be a single polymer, in a preferred embodiment, the fluoropolymer composition of the invention contains at least two different phases—each phase having different properties from the other phase.

Low-Swelling Phase

At least one phase of the multi-phase binder composition contains a fluoropolymer having low swellability. By "low swellability" or "low-swelling" is meant that a pure solid polymer film will swell less than 100 weight percent, and preferably less than 50 weight percent, during prolonged soaking in the electrolyte solvent under ambient condition. In addition, ASTM 2765-16 should be consulted. The low swelling phase can be obtained by selectively controlling factors such as the fluoropolymer crystallinity, cross-linking, comonomer, branching, and other factors known in the art to reduce the swellability of a fluoropolymer in an electrolyte.

By "highly crystalline" is meant that the polymer is at least 30 weight percent, preferably at least 35 weight percent, and more preferably at least 40 weight percent crystalline, as determined using Differential Scanning calorimeter (DSC) analysis according to ASTM D3418. High crystallinity helps prevent dissolution of the binder in the highly corrosive battery environment. The high crystalline phase fluoropolymer is formed from VDF, TFE, CTFE, VF3, VF monomers and/or a combination thereof. The highly crystalline fluoropolymer could also be a copolymer with HFP, HFO-1234yf, HFO-1233zf, HFO-1225, R-1122, perfluoro(methyl vinyl) ether (PMVE), perfluoro(propyl vinyl) ether (PPVE) or other fluoromonomers, where the comonomer is a minor fraction of polymer, generally below 30% by weight, preferably less than 20 wt %, and more preferably less than 10 wt %. If the high crystalline phase is a copolymer, the comonomer is preferably in an amount of greater than 0.1 wt %, or greater than 0.5 wt %. The comonomer can be in an amount of greater than 1 wt %, or greater than 2.2 wt %, greater than 3 wt %.

The highly crystalline phase could also contain a low level, less than 10 percent, less than 5 percent, preferably less than 3 percent, and less than 1 percent, of functional groups or monomeric units.

The low swelling fluoropolymer phase could contain cross-linking or long chain branching, which would further enhance the mechanical strength and wet adhesion properties.

The low-swellability, crystalline phase could be in one or more separate crystalline polymers, or could be part of a multi-phase polymer particle.

Higher Swellability, Softer Polymer Phase

At least one phase of the multi-phase binder composition contains a higher swellability, softer polymer phase. By the "higher swelling", or "high swellability" phase, as used herein, is meant the phase having a swellability of at least 5 percent greater, and more preferably at least 10 percent greater than the low swellability phase in an electrolyte. The higher swelling phase is thus softer than the low-swelling phase.

By "higher swellability", or "high swelling" is meant that pure solid polymer film will swell over 150 weigh percent during prolonged soaking in the electrolyte solvent under ambient condition or deforms under processing conditions to provide adhesion and interconnectivity between particles and adhesion to the substrate. The fluoropolymer phase providing good dry adhesion properties has a higher swellability, and is softer than the low-swellability phase.

In a preferred embodiment, the higher-swellability phase contains from 0.1 to 25 weight percent of functional groups/monomeric units, and preferably from 2 to 20 weight percent, based on the total weight of polymer binder. The functional groups aid in adhesion of the polymer binder, and optional inorganic or organic particles, to the separator, and/or electrode (anode or cathode).

The functional groups of the invention are preferably part of a fluoropolymer, due to the durability of fluoropolymers in the battery environment compared to polyolefins and other thermoplastic binder polymers, though the invention also contemplates the use of functional polymers that are not fluoropolymers, such as a functional acrylic polymer. One requirement of the coating of the invention is that it have less than 10 weight percent leachables in an electrolyte solution. One means of mitigating any leachable functional polymer could be by lightly cross-link the polymer.

The functionalized fluoropolymer of this invention, may be produced by copolymerization using 0.2 to 20 weight percent, preferably 0.5 to 15 weight percent, and more preferably 1 to 10 weight percent of at least one functional, adhesion-promoting comonomer. The copolymerization could add one or more functional comonomers to the fluoropolymer backbone, or be added by a grafting process. The functional fluoropolymer could also be polymerized using from 0.1 to 25, preferably 1.0 to 15, more preferably from 2.2 to 10 weight percent of one or more low molecular weight polymeric functional chain transfer agents. By low molecular weight is meant a polymer with a degree of polymerization of less than or equal to 1,000, and preferably less than 800. In a preferred embodiment, the weight average molecular weight of the polymeric chain transfer agent, as measured by GPC, is 20,000 g/mole of less, more preferably 15,000 g/mole, and more preferably less than 10,000 g/mole. In one embodiment the weight average molecular weight is less than 5,000 g/mole. The low molecular weight functional chain transfer agent is a polymer or an oligomer having two or more monomer units, and preferably at three or more monomer units. The residual polymeric chain transfer agents forming a block copolymer having terminal low molecular weight functional blocks. The functional fluoropolymer could have both functional comonomer and residual functional polymeric chain transfer agents.

The functional copolymer includes one or more "adhesive" comonomers at low levels of from 0.1 to 20 weight percent, preferably 0.5 to 15 wt percent, and most preferably 1 to 10 wt percent, based on the copolymer. Lower level result in no adhesive improvement over the homopolymer. Copolymers with higher levels of the comonomer could be too soft and tacky, making them more likely to dissolve in the battery environment. Useful comonomers generally contain polar groups, or are high surface energy. Examples of useful comonomers include, but are not limited to vinyl acetate, 2,3,3,3-tetrafluoropropene (HFO-1234yf), 2,3,3 trifluoropropene, hexafluoropropene (HFP), and 2-chloro-1-1-difluoroethylene (R-1122). HFP provides good adhesion, but may have reduced solvent resistance. Phosphate (meth) acrylates, (meth) acrylic acid, and hydroxyl-functional (meth)acrylic comonomers could also be used as the comonomer.

Graft copolymers are also contemplated by the invention.

By functional polymeric chain transfer agents, as used in the invention, is meant that the low molecular weight polymer chain transfer agent contains one or more different functional groups. The chain transfer agent has the formula (CH2-CH—(X)—R)y, where y is a integer of between 2 to 1000, X is a linking group including, but not limited to, a covalent or ionic bond, an alkyl, alkene, alkyne, substituted alkyl, substituted alkene, aryl, ester, ether, ketone, amine, amid, amide, organo-silane, and R is a functional group. The functional group (R) provides functionality, and can be provided by the polymerization of functional monomers—either as the sole monomer, or as a comonomer. The functionality could also be added by a post-polymerization reaction or grafting. Useful functional groups include, but are not limited to, carboxylic, hydroxyl, siloxane, ether, ester, sulfonic, phosphoric, phosphonic, sulfuric, amide and epoxy groups, or a mixture thereof.

Multiphase Particles

In one preferred embodiment of the invention, the low-swellability, highly crystalline phase polymer, and the higher swellability, functional group-containing phase polymer, coexist on a single particle.

In one embodiment, a multi-phase particle, it is most useful to have the highly crystalline phase as the particle core, with the functional groups on the outside of the highly crystalline core—thus most efficiently using the functional polymer phase for adhesion.

The multi-phase particle could have many different morphologies, including a core-shell, or a raspberry-type morphology, each with a crystalline core and the functional polymer phase(s) on the outside of the core. The multi-phase polymer could also have a comb or star morphology, with the crystalline fluoropolymer as the backbone, and the functional groups being pendant to the backbone.

One method to synthesize the multi-phase polymer particle is by sequential polymerization to produce a core and shell structure where the shell contains higher functionality and lower crystallinity than the core. This in turn facilitates higher adhesion, higher malleability, and better performance, particularly in the case of water based formulations.

The core polymer may be present at from 2 to 99 weight percent, preferably from 70 to 95 weight percent, preferably 80 to 95% with the outer phase functional polymer making up 1 to 98, and preferably 5 to 30 weight percent, preferably 5 to 20 weight percent of the multi-phase particle.

In the case of sequential co-polymerization, the polymer is formed by synthesizing the matrix polymer in a typical fashion for forming a polyvinylidene fluoride polymer, as known to one of skill in the art. This can be by an emulsion, solution or suspension polymerization. At a point in the polymerization after at least 50 percent, preferably 70 percent, and more preferably 90 up to 100 percent of the high crystalline phase monomer/monomers have been added, a functional comonomer is introduced into the reactor. The second feed can be a single fluoromonomer, a mixture of fluoromonomers, functional monomer, capable of copolymerizing with the first component monomers. The second feed also could contain a functional chain transfer agent. The second feed creates a functionalized polymer on the outer side of the polymer particle, such as a shell or a raspberry morphology.

As a second fluoromonomer(s) feed, TFE, CTFE, VF3, VF, HFP, 1234yf, 1233ze, PFMV, and PPME can be used in the shell composition at a richer ratio than the core composition to provide softness, flexibility and malleability.

As a second functional non-fluoromonomer(s) feed, vinyl sulfonic, vinyl phosphoric, acrylic acid, methacrylic acids, and vinyl acetate can be used in the shell to facilitate a higher interaction with surface of separator and/or with optionally added nano-ceramics which in turn results in a higher adhesion of coating onto separator, better interconnectivity within coating, and better mechanical strength of coating.

The second feed could also contain, functional chain transfer agents such as low molecular weight polyacrylic acid, polylactic acid, polyphosphonic acid, polysulfonic acid, and polymaleic acid can be added at a higher ratio during the polymerization of shell to provide adequate functionality on the backbone of polymers.

Heterogeneous, Gradient/Tapered Multiphase Particles

A gradient or tapered multiphase particle can be used in the binder composition of the invention. In the case of gradient co-polymerization, the polymerization is started by a typical fashion for synthesizing a fluoropolymer such as polyvinylidene fluoride polymer, as known to one of skill in the art. This can be by an emulsion, solution or suspension polymerization. At a predetermined point in the polymerization of the high crystalline phase, a functional comonomer stream is introduced into the reactor. The second feed can be a single fluoromonomer, a mixture of fluoromonomers, functional monomer, capable of copolymerizing with the first component monomers. The ratio of second to the first monomer streams could be constant or increases as polymerization proceeds. The second stream creates a gradient of functionalized polymer from the beginning to the end of the polymer particle with more functionality at the end.

Figure 5:
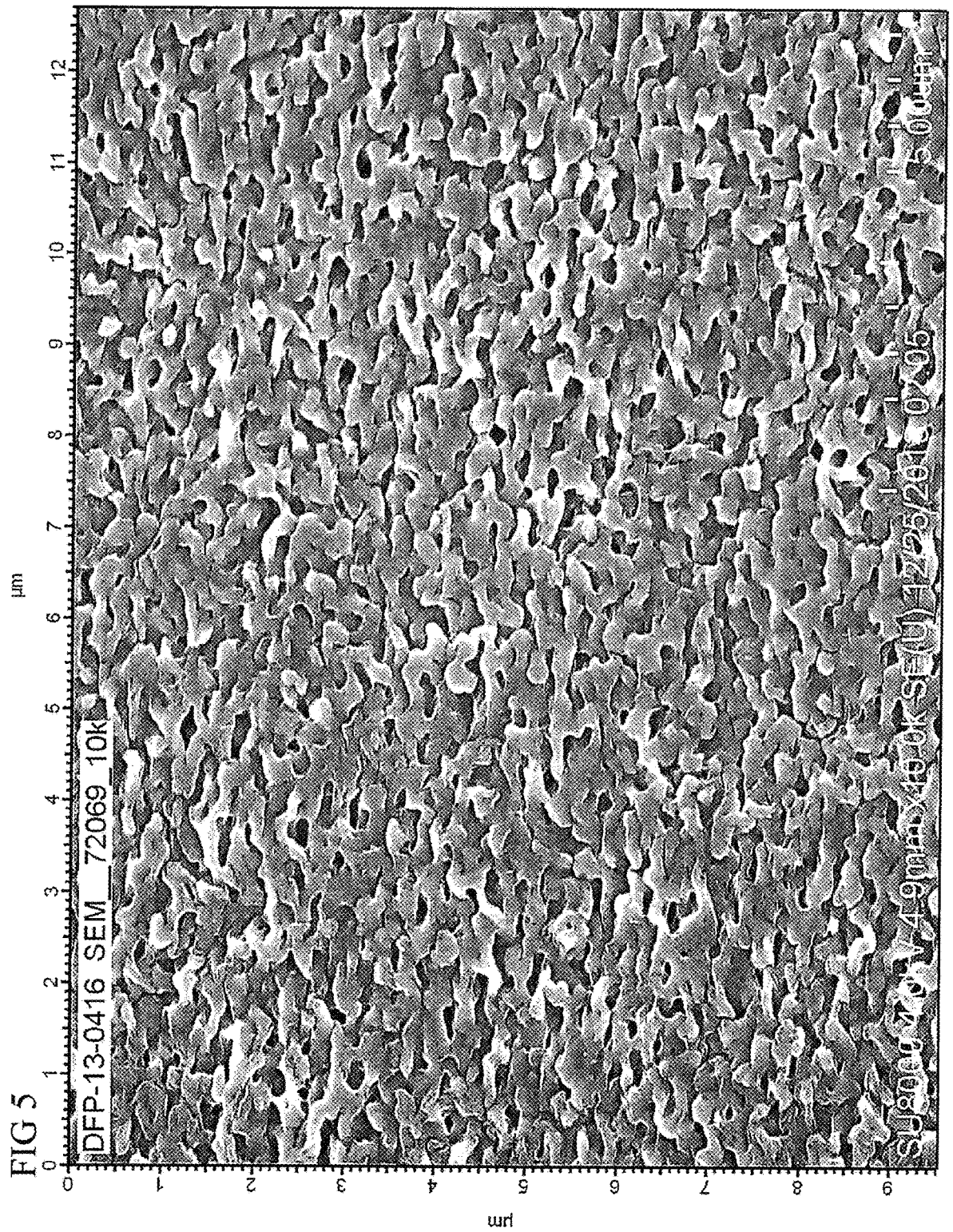
FIG. 5 SEM of a co-continuous fluoropolymer.

The heterogeneous copolymer particles useful in the invention contains two or more co-continuous phases. The phases can be distinct from each other, and can be seen in a scanning electron microscope (SEM) image as in FIG. 5. These heterogeneous copolymers are described in US2018-0044456. U.S. Pat. No. 6,187,885 also teaches multiphase copolymers.

In one embodiment of the invention, the low-swellability, highly crystalline phase polymer, and the higher swellability, functional group-containing phase polymer, coexist in a single co continuous particle.

The first co-continuous phase is rich in vinylidene fluoride monomer units, containing at least 85%, at least 90 weight percent, and preferably at least 95 weight percent of vinylidene fluoride monomer units. The first co-continuous phase can be a homopolymer such as a homopolymer of polyvinylidine fluoride (PVDF) or a copolymer of polyvinylidene fluoride. If a copolymer, the co monomer can be one or more other fluoromonomers chosen the group tetrafluoroethylene, trifluoroethylene, chlorotrifluoroethylene, hexafluoropropene, vinyl fluoride, pentafluoropropene, perfluoromethyl vinyl ether (PMVE), perfluoro (propyl vinyl) ether (PPVE), HFO-1234yf, HFO-1233zf, HFO-1225, R-1122, or other fluoromonomers and/or a combination thereof. If the fluoro-comonomer in the first (low swellable) phase is the same as the primary comonomer in the second (high swellable) co-continuous phase, then no more than 10% of that comonomer can be present in the first co-continuous phase, since the polymers in the phases must be different enough to thermodynamically form separate phases. In one embodiment, the difference in the level of a common co-monomer between the first and second phase copolymers should be at least 10 wt percent.

In some embodiments the final copolymer composition contains from 40 to 99 weight percent of the first co-continuous phase, preferably from 50 to 97, and more preferably from 60 to 95 weight percent, and correspondingly from just over 1 to 60 weight percent, preferably greater than 3 to 50 and more preferably 5 to 40 weight percent of a second co-continuous phase. Preferably the total comonomer in the multiphase particle is greater than 10%, preferably at least 11%, preferably at least 12%.

The second co-continuous phase contains a copolymer that will thermodynamically separate from the first co-continuous phase in the formation of the solid state. The copolymer contains an effective amount of a comonomer chosen from hexafluroporpylene (HFP) and perfluroalkyl ether (PAVE), chlorotrifluoro ethylene (CTFE), trifluoroethylene, with a majority (greater than 50 wt %) of vinylidene fluoride monomer units. Preferably the second co-continuous phase contains at least 1 percent by weight of HFP or PAVE. The copolymer may also contain other comonomers that are copolymerizable with VDF.

The effective amount of the comonomer being a level of comonomer that allows the copolymer to form a distinct separate phase from the first phase polymer. For HFP, an effective amount of HFP monomer in the second-phase is from 5 to 40 weight percent, preferably greater than 10 to 40 weight percent, and more preferably from 11 to 35 weight percent, from 12 to 35 wt percent or from 13 to 35 wt percent.

The perfluoro alkyl ethers useful in the invention are those having the structure: $CF_2=CF-O-R_f$, where $R_f$ is one or more perfluoroalkyl groups selected from $-CF_3$, $-CF_2CF_3$, and $-CF_2CF_2CF_3$. A preferred perfluoroalkyl vinyl ether is perfluoromethyl vinyl ether.

The second co-continuous phase can contain from 5 to 40 weight percent of HFP and/or PAVE, more preferably greater than 10 to 40 weight percent, and more preferably from 11 to 35 weight percent, from 12 to 35 wt percent, from 13 to 35 weight percent or from 15 to 25 wt percent based on the total amount of all monomers fed to the reactor.

It is understood that TFE, CTFE, VF3, VF monomers and/or a combination thereof could be used in conjunction with or in place of the VDF in the co-continuous polymer.

The copolymer composition containing both the first and second co-continuous phases together typically has a melt viscosity of 1 to 34 Kpoise as measured according to ASTM method D-3835 measured at 450° F. (232° C.) and 100 $sec^{-1}$.

The gradient fluoropolymer preferably has a melting point of greater than 155 C, preferably greater than 160 C, preferably 165 C or greater.

Multi-Phase Binder Composition

The multiphase binder composition of the invention can be an aqueous or solvent dispersion or slurry, containing at least one low swellable polymer phase and at least one higher swellable polymer phase. The polymer particles should be discrete, and should be as small as possible for good dispersion and for reduced spacing between the separator and electrodes. The polymer particles of the multi-phase fluoropolymer preferably have a weight average particle size of less than 1 micrometer, preferably less than 800 nm, more preferably less than 600 nm, and more preferably less than 500 nm. The average particle size is at least 10 nm, and preferably greater than 50 nm.

The multi-phase binder composition could be a blend of at least one low-swellability polymer dispersion with at least one higher swellability polymer dispersion. The blend could be a solvent or an aqueous dispersion. In one embodiment, at least two latexes (at least one low-swellability, and at least one higher swellability polymer) are blended to form the binder composition. In a blend the low swellability polymer may represent from 2 to 99 weight percent, from 70-99, preferably from 70 to 95 weight percent, from 80 to 95 wt % with the higher swellable polymer making up 1 to 98, and preferably 30 to 1 wt %, 5 to 30 weight percent or 20 to 5 wt % of the blend composition.

In the preferred case of a multi-phase particle dispersion, the dispersion could be used as synthesized, or may be blended with another functional or non-functional fluoropolymer dispersion. The multi-phase particles, with the functional phase on the outside, maximizes the use of the functional polymer, without sacrificing the mechanical strength provided by the highly crystalline polymer. The multiphase co-continuous particles provide lower swellibility for the particle while incorporating greater functionality, for example greater than 10% wt total co monomer in the PVDF copolymer or greater than 11% comonomer or greater than 15% total comonomer in the multiphase particle while still maintaining an acceptable level of swelling of less 100%, preferably less than 90%.

Inorganic Particles

The binder composition may optionally contain, and preferably does contain inorganic particles, which serve to form micropores and to maintain the physical shape as spacers in the separator coating, and serve as the active ingredients (such as powdery electrode material) in the anode and cathode. The inorganic particles also aid in heat resistance of the battery components. The nature of the powdery electrode-forming material depends on whether the composition will be used to form a positive or a negative electrode.

In a separator coating, the inorganic particles are powdery particulate materials, which must be electrochemically stable (not subjected to oxidation and/or reduction at the range of drive voltages). Moreover, the powdery inorganic materials preferably have a high ion conductivity. Materials of low density are preferred over higher density materials, as the weight of the battery produced can be reduced. The dielectric constant is preferably 5 or greater. Useful inorganic powdery materials in the invention include, but are not limited to $BaTiO_3$, $Pb(Zr, Ti)O_3$, $Pb_{1-x}La_xZr_yO_3$ ($0<x<1$, $0<y<1$), $PbMg_3Nb_{2/3}O_3$, $PbTiO_3$, hafnia ($HfO_2$), $SrTiO_3$, $SnO_2$, $CeO_2$, $MgO$, $NiO$, $CaO$, $Zno$, $Y_2O_3$, boehmite (y-AlO(OH)), $Al_2O_3$, $TiO_2$, $SiC$, $ZrO_2$, boron silicate, $BaSO_4$, nano-clays, ceramics, or mixtures thereof. Useful organic fibers, include, but are not limited to aramid fillers and fibers, polyetherether ketone and polyetherketone ketone fibers, PTFE fibers, and nanofibers.

In a cathode, the active inorganic electrode material may be an oxide, sulfide or hydroxide of lithium and/or a transition metal (including but not limited to cobalt, manganese, aluminum, titanium, or nickel, and iron phosphates, manganese phosphate). Double, and triple salts of lithium are also contemplated. Preferred positive electrode materials include, but are not limited to, $LiCoO_2$, $LiNi_xCo_{1-x}O_2$, $LiMn_2O_2$, $LiNiO_2$, $LiFePO_4$, $LiNi_xCo_yMn_zO_m$, $LiNi_xMn_yAl_zO_n$, where $x+y+z=1$ and m is an integer representing the number of oxygen atom in the oxide to provide an electron-balanced molecule; as well as lithium-metal oxides such as lithium cobalt oxide, lithium iron phosphate, lithium manganese phosphate, lithium-nickel oxide, and lithium-manganese oxide.

In the case of a negative electrode, the active inorganic material is generally a carbonaceous material, nano-titanate, silicon, or other matrix capable of being doped with lithium ions. Useful carbonaceous materials include, but are not limited to graphite, manmade graphite, carbon, carbon black, carbon nanotubes acetylene black, phenolic resin, pitch, tar, etc and their combination thereof with silicon or silicon oxide. In the present invention carbon fibers can also be used.

The ratio of polymer solids to inorganic material is from 0.5-25 parts by weight of polymer binder solids to 75 to 99.5 parts by weight inorganic powdery material, preferably from 0.5-15 parts by weight of polymer binder solids to 85 to 99.5 parts by weight powdery inorganic material, more preferably from 1-10 parts by weight of polymer binder solids to 90 to 99 parts by weight powdery electrode material, and in one embodiment from 0.5-8 parts by weight of polymer binder solids to 92 to 99.5 parts by weight powdery inorganic material. In one embodiment the preferred binder comprises a PVDF polymer. If less polymer is used, complete interconnectivity may not be achieved, and if more polymer is used, there is a reduction in conductivity, and also the composition takes up volume and adds weight—and one use of the composition is for very small and light batteries.

Other Additives

The binder composition of the invention may optionally include 0 to 15 weight percent based on the polymer, and preferably 0.1 to 10 weight percent of additives, including but not limited to thickeners, pH adjusting agents, anti-settling agents, surfactants, wetting agents, fillers, anti-foaming agents, and fugitive adhesion promoters.

The multi-phase polymer binder of the invention has excellent dry adhesion. Dry adhesion can be determined by casting a solution of multi-phase polymer on an aluminum foil to form a 3 micron thick solid, unfilled polymer film after drying, and measuring the peel strength. The peel strength should be at least 10 N/m, and preferably at least 15 N/m as measured by 180 degree peel test at 55 mm/min peel rate which is common in battery industry.

Wet adhesion can be determined by soaking the 3 micron solid film on aluminum foil in electrolyte solution at 60 C for 72 hr and looking for defects and delamination.

Leachables can be tested by forming a 10 micron film, and placing the film in electrolyte at room temperature for 72 hours. Less than 10% leachables should be found.

Formation of a Coated Anode, Cathode and Separator.

For use as an electrode coating: the binder composition is applied onto at least one surface, and preferably both face surfaces, of an electroconductive substrate by means known in the art, such as by brush, roller, ink jet, squeegee, foam applicator, curtain coating, vacuum coating, or spraying. The electroconductive substrate is generally thin, and usually consists of a foil, mesh or net of a metal, such as aluminum, copper, lithium, iron, stainless steel, nickel, titanium, or silver. The coated electroconductive substrate is then dried to form a coherent composite electrode layer, which may then be calendared, providing an interconnected composite electrode usable in a non-aqueous-type battery. The aqueous electrode composition can be optionally baked at elevated temperature to achieve high adhesion strength. The dried electrode can be optionally subjected to calendaring at high pressure and high temperature to further improve electrode adhesion.

For use as a separator coating: A porous separator is coated on at least one side with the coating composition. There is no particular limitation in choosing the separator substrate that is coated with the aqueous coating composition of the invention, as long as it is a porous substrate having pores. Preferably the substrate is a heat resistant porous substrate having a melting point of greater than 140° C. Such heat resistant porous substrates can improve the thermal safety of the coated separator under external and/or internal thermal impacts.

The porous substrate may take the form of a membrane, or fibrous web. When the porous substrate is fibrous, it may be a nonwoven web forming a porous web, such as a spunbond or melt blown web.

Examples of porous substrates useful in the invention as the separator include, but are not limited to: polyolefins, polyethylene terephthalate, polybutylene terephthalate, polyester, polyacetal, polyamide, polycarbonate, polyimide, polyetherether ketone, polyether sulfone, polyphenylene oxide, polyphenylene sulfido, polyethylene naphthalene or mixtures thereof. Other heat resistant engineering plastics may be used with no particular limitation. Non-woven materials of natural and synthetic materials may also be used as the substrate of the separator.

The porous substrate generally has a thickness of from 1 micron to 50 microns, and are typically cast membranes of non-wovens. The porous substrate preferably has a porosity of between 5% and 95%. The pore size (diameter) preferably ranges from 0.001 micron to 50 micron, more preferably from 0.01 micron to 10 micron. When the pore size and porosity are less than 0.01 micron and 5%, respectively, the porous substrate may function as resistance layer. When the pore size and porosity are greater than 50 micron and 95%, respectively, it is difficult to maintain mechanical properties.

Current lithium ion batteries and lithium ion polymer batteries typically use polyolefin-based separators, either alone or coated with aluminum oxide or ceramic particles. The porous substrate preferably has a porosity of between 15% and 85%. The pore size (diameter) preferably ranges from 0.001 micron to 0.20 micron, more preferably from 0.002 micron to 0.10 micron.

The binder coating composition can be a solution, solvent dispersion, or aqueous dispersion, which is applied onto at least one surface of a porous substrate by means known in the art, such as by brush, roller, ink jet, dip, knife, gravure, wire rod, squeegee, foam applicator, curtain coating, vacuum coating, or spraying. The coating is then dried onto the separator at room temperature, or at an elevated temperature. The final dry coating thickness is from 0.5 to 15 microns, preferably from 1 to 8 microns, and more preferably from 1 to 5 microns in thickness.

The coated separators, anodes and cathodes of the invention can be used to form an electrochemical device, such as a battery, capacitor, electric double layer capacitor, membrane electrode assembly (MEA) for fuel cell, by means known in the art. A non-aqueous-type battery can be formed by placing a negative electrode and positive electrode on either side of the coated separator.

EXAMPLES

The core-shell polymer is formed by emulsion process in which a reactor is charged with deionized water, water-soluble surfactant capable of emulsifying the reactant mass during polymerization and optionally antifouling paraffin wax. The mixture is stirred and deoxygenated.

A predetermined amount of chain transfer agent (functional and/or non-functional) is then introduced into the reactor, the reactor temperature raised to the desired level and vinylidene fluoride (VDF) or VDF combined with other fluoromonomers fed into the reactor. Once the initial charge of monomer/monomers is introduced and the pressure in the reactor has reached the desired level, an initiator solution is introduced to start the polymerization reaction. The temperature of the reaction can vary depending on the characteristics of the initiator used and one of skill in the art will know how to do so. Typically, the temperature will be from about 30° to 130° C., preferably from about 50° to 110° C.

Similarly, the polymerization pressure may vary, but, typically it will be within the range 40 to 50 atmospheres. Following the initiation of the reaction, the monomer/monomers are continuously fed along with additional initiator to maintain the desired pressure. Once the desired amount of major component polymer has been reached in the reactor (greater than 50% of the higher crystalline phase monomer/monomers fed), the second stream will be added to reactor feed to form the shell component (forming a functional phase). The second stream are generally charged co-continuously with monomers but also can be added as a slug during the shell forming phase. Once the feed of the major phase monomers is complete, initiator feed will be continued for a set period of time to facilitate polymerization of all of these monomers. All feeds will then be stopped. Residual gases (containing unreacted monomers) are vented and the latex recovered from the reactor. The polymer may then be isolated from the latex by standard methods, such as, acid coagulation, freeze thaw or high shear.

In one preferred embodiment, a polyvinylidene fluoride homopolymer is formed as the major phase, followed after at least 50 percent of the total monomer is charged by the introduction of second stream of a monomer mixture of vinylidene fluoride and functional fluoromonomer(s) and/or functional chain transfer agent to make the shell. The level of second stream for making shell is up to 30 weight percent of the major monomer feed, preferably up to 20 weight percent, and more preferably up to 10 weight percent.

In addition, a polyvinylidene fluoride homopolymer synthesis can be started in a typical fashion. After 25 weight percent of VDF monomer is charged, a functional comonomer stream is introduced into the reactor. The ratio of second to the VDF monomer streams could be constant or increasing as polymerization proceeds. The level of second stream for making gradient structure is up to 30 weight percent of the major monomer feed, preferably up to 20 weight percent, and more preferably up to 10 weight percent.

In addition to formation by a sequential copolymerization process, the multiphase composition of the invention may also be formed by blending a polyvinylidene fluoride based polymer with another fluoropolymer which may be a homopolymer, copolymer or terpolymer. The blending of the two polymers may be in the form of a melt blending, solution blending, or latex blending or aqueous dispersion blending of corresponding two polymers. Melt blending can be done with powders or pellets which must be dissolved in a solvent to form a homogeneous uniform blend.

While not being bound by any particular theory, it is believed that the matrix of the core will be more crystalline than the shell, and the shell phase will be much less crystalline, resulting in the softness, flexibility, higher adhesion, and malleability.

Comparative Example 1: Co Polymer

The following comparative example is based on the teachings of U.S. Pat. No. 8,765,890 B2. Into an 80-gallon (303 liter) stainless steel reactor was charged, 345 lbs (156 kg) of deionized water, 250 grams of PLURONIC 31R1 (non-fluorinated non-ionic surfactant from BASF), and 0.35 lbs (0.16 kg) of ethyl acetate. Following evacuation, agitation was begun at 23 rpm and the reactor was heated. After the reactor temperature reached the desired set point of 100° C., the VDF and HFP monomer were introduced to reactor with HFP ratio of 13.2 wt % of total monomers. Reactor pressure was then raised to 650 psi (4481 kilopascal) by charging approximately 35 lbs (15.9 kg) total monomers into the reactor. After reactor pressure was stabilized, 3.5 lbs (1.6 kg) of initiator solution made of 1.0 wt % potassium persulfate and 1.0 wt % sodium acetate were added to the reactor to initiate polymerization. Upon initiation, the ratio of HFP to VDF was so adjusted to arrive at 4.4% HFP to total monomers in the feed. The rate of further addition of the initiator solution was also adjusted to obtain and maintain a final combined VDF and HFP polymerization rate of roughly 90 pounds (41 kg) per hour. The VDF and HPF copolymerization was continued until approximately 160 pounds (73 kg) monomers were introduced in the reaction mass. The HFP feed was stopped but VDF feed continued till approximately 180 lbs (82 kg) of total monomers were fed to the reactor. The VDF feed was stopped and the batch was allowed to react-out at the reaction temperature to consume residual monomer at decreasing pressure. After 40 minutes, the initiator feed and agitation were stopped and the reactor was cooled, vented and the latex recovered. Solids in the recovered latex were determined by gravimetric technique and were about 32 weight % and melt viscosity of about 38 kp according to ASTM method D-3835 measured at 450° F. (232° C.) and 100 sec-1. The melting temperature of the resin was measured in accordance with ASTM method D-3418 and was found to be about 152° C. The weight average particle size was measured by NICOMP laser light scattering instrument and was found to be about 160 nm.

Comparative Example 2: Homopolymer

Into an 80-gallon (303 liter) stainless steel reactor was charged, 345 lbs (156 kg) of deionized water, 250 grams of PLURONIC 31R1 (non-fluorinated non-ionic surfactant from BASF), and 0.3 lbs (0.136 kg) of propane. Following evacuation, agitation was begun at 23 rpm and the reactor was heated. After the reactor temperature reached the desired set point of 100° C., the vinylidene fluoride (VDF) charge was started. Reactor pressure was then raised to 650 psi (4481 kilopascal) by charging approximately 35 lbs (15.9 kg) VDF into the reactor. After reactor pressure was stabilized, 4.5 lbs (2.0 kg) of initiator solution made of 1.0 wt % potassium persulfate and 1.0 wt % sodium acetate was added to the reactor to initiate polymerization. The rate of further addition of the initiator solution was adjusted to obtain and maintain a final VDF polymerization rate of roughly 70 pounds (32 kg) per hour. The VDF homopolymerization was continued until approximately 150 pounds (68 kg) VDF was introduced in the reaction mass. The VDF feed was stopped and the batch was allowed to react-out at the reaction temperature to consume residual monomer at decreasing pressure. After 25 minutes, the agitation was stopped and the reactor was cooled, vented and the latex recovered. Solids in the recovered latex were determined by gravimetric technique and were about 27 weight % and melt viscosity of about 27 kp according to ASTM method D-3835 measured at 450° F. (232° C.) and 100 sec-1. The melting temperature of the resin was measured in accordance with ASTM method D-3418 and was found to be about 162° C. The weight average particle size was measured by NICOMP laser light scattering instrument and was found to be about 150 nm.

Comparative Example 3: Functionality

Into an 80-gallon (303 liter) stainless steel reactor was charged, 345 lbs (156 kg) of deionized water, 270 grams of PLURONIC 31R1 (non-fluorinated non-ionic surfactant from BASF). Following evacuation, agitation was begun at 23 rpm and the reactor was heated. After the reactor temperature reached the desired set point of 100° C., the VDF and HFP monomer were introduced to reactor with HFP ratio of 22.3 wt % of total monomers. Reactor pressure was then raised to 650 psi (4481 kilopascal) by charging approximately 35 lbs (15.9 kg) total monomers into the reactor. After reactor pressure was stabilized, 3.5 lbs (1.6 kg) of initiator solution made of 1.0 wt % potassium persulfate and 6.0 wt % functional chain transfer agent of low MW-PAA with MW of about 3000 Dalton were added to the reactor to initiate polymerization and induce functionality. Upon initiation, the ratio of HFP to VDF was so adjusted to arrive at 8% HFP to total monomers in the feed. The rate of further addition of the initiator solution was also adjusted to obtain and maintain a final combined VDF and HFP polymerization rate of roughly 60 pounds (27 kg) per hour. The VDF and HPF copolymerization was continued until approximately 160 pounds (73 kg) monomers were introduced in the reaction mass. The HFP feed was stopped but VDF feed continued till approximately 180 lbs (82 kg) of total VDF monomer was fed to the reactor. The VDF feed was stopped and the batch was allowed to react-out at the reaction temperature to consume residual monomer at decreasing pressure. After 20 minutes, the initiator feed and agitation were stopped and the reactor was cooled, vented and the latex recovered. Solids in the recovered latex were determined by gravimetric technique and were about 32 weight % and melt viscosity of about 68 kp according to ASTM method D-3835 measured at 450° F. (232° C.) and 100 sec-1. The melting temperature of the resin was measured in accordance with ASTM method D-3418 and was found to be about 138° C. The weight average particle size was measured by NICOMP laser light scattering instrument and was found to be about 160 nm.

Characterization:

After drying, a solution of each of the above resins was prepared at 8 weight percent in NMP. The solution was cast onto a 15-micron aluminum foil (6×15 inches) at room temp using a doctor blade or drawdown bar, then placed in an oven at 120° C. for ½ hr to form about a 3 micron solid film. Adhesion of the multiphase polymer onto Al-foil was measured by using an Instron with an 80-degree peel test configuration at peeling rate of 55 mm/min.

The wet adhesion was determined by placing coated Al-foils into a typical electrolyte solvent i.e. EC/DEC/DMC for 72 hr at 60° C. The visual inspection is used to determine the number and size of blisters on the coated Al-foil.

Swelling: A 10 micron thin dry film was cast from the 8 weight percent NMP solution onto a glass substrate, and placed in 120° C. oven to dry. The film was lifted and then placed into a typical electrolyte solvent i.e. EC/DEC/DMC for 72 hr at 60 C. Swelling was determined by measuring the weight change of the swollen film relative to dried film for each individual phase.

$$\% \text{ swelling} = \frac{m_{swelled}}{m_{initial}} \times 100\%$$

$$\% \text{ Leachables} = \frac{m_{initial} - m_{dried}}{m_{initial}} \times 100\%$$

Where $m_{initial}$ is the weight of initial dry polymer, $m_{swelled}$ is the weight of swollen polymer, and $m_{dried}$ is weight of polymer dried after solvent exposure.

Application Examples

The above PVDF based latexes were then formulated into an aqueous coating composition, with and without inorganic particles and applied to a polyolefin separator and dried at elevated temperature, but below 90° C., or a fugitive adhesion promoter was used to improve interconnectivity and adhesion. The fugitive adhesion promoter can be a chemical material, an energy source combined with pressure, or a combination, used at an effective amount to cause interconnectivity of the components of the aqueous composition during formation of the electrode. A useful organic solvent is N-methyl-2-pyrrolidone, dimethylformamide, N,N-dimethylacetamide, dimethylsulfoxide (DMSO), hexamethylphosphamide, dioxane, tetrahydrofuran, tetramethylurea, triethyl phosphate, trimethyl phosphate, dimethyl succinate, diethyl succinate and tetraethyl urea.

In the case of energy as the fugitive adhesion promoter, useful energy sources are heat, IR radiation, and radio frequency (RF).

Also, part of those above latexes was spray dried into fine powders with average particle size of 1-30 microns, then were re-dispersed and formulated in aqueous media, with and without inorganic particles, and applied to a polyolefin separator and dried at elevated temperature, but below 90° C.

In addition, part of spray dried powder above resins were formulated into a non-aqueous coating composition, with and without inorganic particles, and applied to a polyolefin separator and dried at elevated temperature, but below 90° C.

Random and co-continuous copolymers of VDF and HFP, having various wt % of HFP as indicated in the table, were tested for weight gain, swellibility and leachables. The results are in Table 1.

TABLE 1

| | Polymer Powder | Target HFP(%) | Tm(° C.) | Weight Gain | Swelling | Extractible |
|---|---|---|---|---|---|---|
| 1 | X Random copolymer | 17 | 120 | 300 | 300 | Dissolved |
| 2 | Random copolymer Y | 12 | 135 | 75 | 78 | 1.71 |
| 3 | Random copolymer Z | 10 | 142 | 38 | 39 | 0.47 |
| 4 | A Random copolymer | 5 | 157 | 21 | 21 | 0.28 |
| 5 | B Heterogeneous | 18 | 166 | 67 | 78 | 6.16 |
| 7 | C Heterogeneous | 10 | 165 | 35 | 36 | 0.64 |
| 8 | D Heterogeneous | 10 | 165 | 39 | 40 | 0.95 |
| 9 | Control | 5 | 155 | 22 | 22 | 0.34 |

The electrolyte mixture was EC (ethylene carbonate), DMC (Dimethyl carbonate) and EMC (ethylene methyl carbonate) in a ratio of about 1:1:1.

The polymers in Table 1 are PVDF/HFP copolymers.

The data of table 1 is shown as graphs in FIGS. 1 to 4. The data shows in heterogeneous copolymer, the increasing rate as a function of HFP content is relatively gentle or linear compared to the Random copolymer. From polymer A to polymer X, the slope gets unexpectedly larger and weight gain and swelling ratio of polymer X cannot be calculated because it dissolves completely in electrolyte. In sharp contrast, from polymer C to polymer B the slope seems to be gentle, comparing to random copolymers.

Among heterogeneous grades, the tendency is still the same though that higher HFP content gives higher electrolyte uptake/swelling it is measurably lower than the random copolymers or like HFP content particular at total copolymer HFP content of above 10 wt %. The heterogeneous grade can be used to balance adhesion and swelling.

What is claimed is:

1. A separator binder composition for coating a separator comprising two or more different phases, wherein said phases comprise:
    a) a first fluoropolymer phase has a swellability of less than a 50 weight percent gain in an electrolyte solvent;
    b) a second fluoropolymer phase having a swellability in the electrolyte solvent that is at least 10 percent greater than the swellability of said first fluoropolymer phase, wherein said first fluoropolymer phase and said second fluoropolymer phase each have at least 10 weight percent vinylidene fluoride units, wherein the separator binder composition comprises discrete polymer particles having an average particle size of less than 0.5 micrometer.

2. The separator binder composition of claim 1, wherein the first fluoropolymer phase and the second fluoropolymer phase are heterogeneous and or co-continuous.

3. The separator binder composition of claim 1, wherein the first fluoropolymer phase is at least 30 weight % crystalline.

4. The separator binder composition of claim 1, wherein said separator binder composition further comprises 50 to 99 weight percent of inorganic particles, based on weight of polymer binder in the separator binder composition, wherein said inorganic particles being electrochemically stable inorganic particles.

5. The separator binder composition of claim 1, wherein said separator binder composition comprises either a blend of one or more first fluoropolymers with one or more second fluoropolymers, wherein said first fluoropolymers comprise the first fluoropolymer phase and said second fluoropolymers comprise the second fluoropolymer phase or is a single multi-phase particle comprising both the first fluoropolymer phase and the second fluoropolymer phase.

6. The separator binder composition of claim 5, wherein said single, multi-phase particle has a core-shell or raspberry morphology or gradient composition.

7. The separator binder composition of claim 1, wherein
a) the first fluoropolymer phase comprises at least one fluoropolymer having a crystallinity of 35 weight percent or greater, and
b) the second fluoropolymer phase comprises, at least one fluoropolymer comprising from 0.1 to 25 wt % of functional groups, based on the total polymer binder.

8. The separator binder composition of claim 7, wherein said separator binder composition comprises either a blend of one or more first fluoropolymers with one or more second fluoropolymers, wherein said first fluoropolymers comprise the first fluoropolymer phase and said second fluoropolymers comprise the second fluoropolymer phase or is a single multi-phase particle comprising both the first fluoropolymer phase and the second fluoropolymer phase wherein the phases are heterogeneous and or co-continuous or are in a core shell form.

9. The separator binder composition of claim 7, wherein said separator binder composition further comprises 50 to 99 weight percent of inorganic particles, based on weight of polymer binder in the separator binder composition, wherein-said inorganic particles being electrochemically stable inorganic particles.

10. A separator of an electrochemical device, wherein said separator comprises a coating on at least one side comprising the separator binder composition of claim 1, wherein said separator binder composition has the following properties: a) a wet adhesive strength resulting in less than 10 defects/m²; b) a dry adhesive strength of greater than 10 N/m, as measured by 180 degree peel strength measurement; and c) leachables of less than 10 weight percent, as measured on a 10 micron dry film.

11. The separator of claim 10, wherein said separator binder composition comprises either a blend of one or more first fluoropolymers with one or more second fluoropolymers, wherein said first fluoropolymers comprise the first fluoropolymer phase and said second fluoropolymers comprise the second fluoropolymer phase, or is a single multi-phase particle comprising both the first fluoropolymer phase and the second fluoropolymer phase, wherein the phases are heterogeneous and or co-continuous or are in a core shell form.

12. The separator of claim 10, wherein said separator binder composition further comprises 50 to 99 weight percent of inorganic particles, based on-weight of polymer binder in the binder composition, wherein said inorganic particles being electrochemically stable inorganic particles.

13. A method for forming a coated separator, comprising the steps of dip-coating, spray coating, micro-gravure coating or slot coating at least one side of a separator with the separator binder composition of claim 1, then drying said coated separator to form a dried, coated separator.

14. The method of claim 13, wherein the coated separator has a thickness of from 1 to 5 micrometers when formed from a solvent dispersion, and from 15 to 30 micrometers when formed from an aqueous dispersion.

* * * * *